United States Patent [19]
Richard

[11] 3,936,969
[45] Feb. 10, 1976

[54] INFLATABLE BLIND

[76] Inventor: Wilton Richard, 2230 South David Drive, Abbeville, La. 70510

[22] Filed: July 3, 1974

[21] Appl. No.: 485,525

[52] U.S. Cl. .................................. 43/1; 297/DIG. 3
[51] Int. Cl.² ....................................... A01M 31/00
[58] Field of Search .............. 43/1; 52/2; 190/8, 1; 297/DIG. 3

[56] References Cited
UNITED STATES PATENTS

| | | | |
|---|---|---|---|
| 3,052,054 | 9/1962 | Littleton et al. | 43/1 |
| 3,204,678 | 9/1965 | Worcester | 297/DIG. 3 |
| 3,540,170 | 11/1970 | Flowers | 43/1 |

Primary Examiner—Russell R. Kinsey
Assistant Examiner—Peter K. Skiff
Attorney, Agent, or Firm—John F. Sieberth

[57] ABSTRACT

A compact, portable, inflatable blind designed for use on land, on water, or on both land and water. It is composed of a flexible inflatable body which serves as a buoyant concealment device when inflated and which can be folded up into a small bundle when deflated, a seat-forming member which preferably is inflatable and contains a pouch to receive the folded body, and means supporting the seat-forming member across the lower interior of the inflated body. Various advantageous features of construction and use are described.

17 Claims, 17 Drawing Figures

INFLATABLE BLIND

BACKGROUND OF THE INVENTION

This invention relates to a novel and useful blind construction and more particularly to an inflatable blind suitable for use by hunters, wildlife photographers and the like.

Various types of blinds and other concealment devices have been proposed heretofore. See for example U.S. Pats. 2,327,169; 2,816,297; 3,052,054; and 3,540,170. Despite these and other efforts in the general field, a welcome contribution to the art would be a compact, portable, inflatable blind that can be designed for use on land, on water, or on both land and water. This invention is believed to represent such a contribution. Besides possessing the foregoing advantageous characteristics, the blinds of this invention are capable of being manufactured inexpensively; are easy to use, transport and store; are effective in providing comfortable concealment for the user; are readily camouflagable either in manufacture or during use; and are constructed so that the user can have an unobstructed field of movement and view when desired. These and other advantageous features of this invention will become readily apparent from a consideration of the accompanying Drawings, the ensuing description and the appended claims.

Summary of the Invention

In accordance with this invention there is provided, inter alia, an inflatable blind which comprises (1) a seat-forming member having a pouch therein, and (2) a flexible inflatable body for use with the seat-forming member and adapted when deflated and folded to fit within said pouch and when inflated to furnish around said member an upstanding wall affording concealment for the user. The seat-forming member is preferably inflatable although this is not essential. Preferably the body of the device includes an elongate inflatable tubular base member from which the inflatable wall extends, as this enables the provision of blinds which are buoyant on water and which have good stability when used on dry land.

A feature of this invention is that the entire blind can be furnished either in the form of an essentially one-piece unitary structure or in the form of an essentially two-piece structure. The one-piece construction involves providing a permanent connection between the seat-forming member and the inflatable body. The two-piece structure involves use of detachable connections between the seat-forming member and the inflatable body—i.e., in this case there is no permanent connection. It is particularly advantageous to provide the seat-forming member in the form of an inflatable cushion having a pouch aligned on one face thereof, to permanently connect the cushion to the body along the back edge of the cushion toward which the pouch opens, and to render the cushion detachably connectable to the body in the vicinity of the sides of the cushion. This furnishes a one-piece structure which is easy to assemble and disassemble, as will be apparent from the description hereinafter.

A further preferred embodiment is to provide the seat-forming member in the form of an inflatable cushion having a flap aligned on one face thereof, the cushion when deflated being sufficiently flexible so that essentially one-half of the cushion can be manually depressed into the other half thereof to thereby form a double-walled pouch to receive the folded deflated body, the opening in the pouch so-formed being coverable by said flap. It will be seen that in this embodiment the pouch in the seat-forming member does not exist at all times. Rather, the pouch is created when the deflated cushion is pushed into itself so that essentially one half of its exterior fits within essentially the other half of its exterior. Consequently, the double-walled pouch of this embodiment is created when the blind is packed up for storage or transportion and it remains in existence until the blind is unpacked and the cushion is inflated. Thus in accordance with this invention it will be understood and appreciated that whenever reference is made in general to a seat-forming member or cushion having a pouch therein and the context otherwise permits, such terms are inclusive of an inflatable seat-forming member or cushion of the type described in this paragraph wherein the pouch exists during the time the blind is packed up but does not exist when the blind is unpacked and the cushion is inflated. It will also be understood and appreciated that the preferred embodiment referred to in this paragraph may be used pursuant to this invention in unitary blinds of one-piece construction or of two-piece construction.

In another embodiment the blind is characterized in that the inflatable body includes an inflatable tubular base member and a plurality of inflatable pleated wall portions extending from one side and being disposed along substantially the entire length of said base member, said body when inflated being bendable so that its two ends can be brought together to circumscribe a zone of concealment, and in that the blind includes means for detachably connecting together said two ends of said body to maintain said zone of concealment.

Another aspect of the invention involves the inclusion of means adapted to be secured on the torso of the user for supporting the device when inflated above ground level and below eye level of the user. This makes it possible for the user to walk about with unobstructed view while carrying the inflated blind above ground level without requiring use of his hands.

Particularly preferred embodiments of this invention involve combinations of the foregoing such as, for example, a unitary inflatable blind adapted for use on land and on water which comprises 1. an inflatable seat-forming cushion having a pouch aligned on one face thereof;
2. a flexible inflatable body comprising an elongate inflatable tubular base member and a plurality of inflatable pleated wall portions extending from one side of said base member and being disposed along substantially the entire length of said base member, said body being adapted:
    a. when deflated to be foldable upon itself into compact form to fit within said pouch, and
    b. when inflated to be bendable so that its two ends can be brought together with the wall portions extending upwardly from said base member to circumscribe a zone of concealment;
3. means connecting and supporting said cushion across the lower interior of the inflated body; and
4. means detachably connecting together said two ends of said body to maintain said zone of concealment.

Such unitary structure may be essentially a one-piece or two-piece system as explained above. Further, the cushion and the body may be separately inflatable and deflatable or they may be inflatable and deflatable in unison. Another preferred feature provides a seat-forming cushion which further includes a flap adapted to be detachably secured over the opening in the pouch when the body folded into compact form is contained within the pouch.

Another particularly preferred blind for use on land and water comprises 1. an inflatable seat-forming cushion having a flap aligned on one face thereof, the cushion when deflated being sufficiently flexible so that essentially one-half of the cushion can be manually depressed into the other half thereof to thereby form a double-walled pouch, the opening in the pouch so-formed being coverable by said flap;
2. a flexible inflatable body comprising an elongate inflatable tubular base member and a plurality of inflatable pleated wall portions extending from one side of said base member and being disposed along substantially the entire length of said base member, said body being adapted:
   a. when deflated to be foldable upon itself into compact form to fit within said pouch, and
   b. when inflated to be bendable so that its two ends can be brought together with the wall portions extending upwardly from said base member to circumscribe a zone of concealment;
3. means connecting and supporting said cushion across the lower interior of the inflated body; and
4. means detachably connecting together said two ends of said body to maintain said zone of concealment.

This unitary blind may be an essentially one- or two-piece structure, and the cushion and body may be separately or commonly inflatable.

The blinds of this invention can be designed for use on water, use on land, or for both uses. Preferably the tubular base member is large enough so that when inflated it is sufficiently buoyant on water to support the weight of the user and his equipment. Use of an inflatable seat-forming member adds buoyance to the system. It will be noted that the seat-forming member serves the added function of being a carrying case for the deflated blind.

This invention thus provides a compact, portable, inflatable blind composed of a flexible thin-walled inflatable body which serves as a buoyant concealment device for the user when inflated and which can be folded up into a small bundle when deflated, a seat-forming member which preferably is inflatable and contains a pouch to receive the folded body, and means for supporting the seat-forming member across the lower interior of the inflated body.

Other features and embodiments of this invention will appear hereinafter.

BRIEF DESCRIPTION OF THE DRAWINGS

FIGS. 6A through 6H are a series of views in perspective depicting in sequential form the disassembly, deflation, folding and packing of a preferred blind of this invention;

FIG. 7A depicts an optional but preferred lifting attachment enabling the user to transport the blind while inflated, while FIG. 7B illustrates the use of this lifting attachment in this manner;

FIG. 8 is a view in perspective of an inflatable seat-forming member permanently connected to the inflatable body of the blind, a fragmentary portion of which is shown; and FIG. 9 depicts an inflatable blind of a different configuration.

DESCRIPTION OF PREFERRED EMBODIMENTS

Referring now to the Drawings wherein like reference characters denote corresponding parts among the several Figures, a preferred blind adapted for use on water as well as on land is composed of a flexible inflatable body designated generally by the numeral 10 and a seat-forming member designated generally by the numeral 30. In the form depicted in FIGS. 1–8 body 10 is composed of an elongate inflatable tubular base member 12 and a plurality of inflatable pleated wall portions 14 extending outwardly (i.e., protruding) from one side of member 12, this side of course being the top of member 12 during use. There are enough such pleated wall portions 14 to coincide with the length of base member 12 so that when deflated (note FIG. 6B) body 10 is generally rectangular in configuration. A check valve 11 of the type commonly used on automotive and bicycle tires is suitably positioned on body 10 to facilitate inflation and deflation of the body. Body 10 is fabricated of an air-tight material, such as reinforced or unreinforced natural or synthetic rubbers or plastics, which is sufficiently flexible as to enable the body to be folded several times upon itself when deflated (note FIGS. 6B, 6C, 6D and 6E) to facilitate its packing, transport and storage. In addition, body 10 when inflated is sufficiently flexible and so designed and constructed that its two ends 13, 13 can be brought together to circumscribe an area or zone for occupation by the user. As best seen in FIG. 2 base member 12 is preferably made such that when ends 13, 13 are joined together the central segment 15 of member 12 remains essentially linear for a distance corresponding to the desired width of the blind (e.g., about 3 to 4 feet) and at the ends of segment 15 member 12 bends forwardly at substantially right angles to furnish a pair of generally parallel lateral segments 16, 16. This forward bending may be facilitated by furnishing crease lines 17, 17 on the inner sides of member 12 between segment 15 and segments 16, 16. Additionally, the forwardmost segments 18, 18 of member 12 are preferably arcuate in configuration when inflated (note FIG. 2) so that ends 13, 13 can more readily be brought together to furnish the enclosed zone of concealment for the user. If desired, reinforcing means (not shown) may be provided to assist in maintaining the desired configuration of member 12 during inflation and use. Joining straps 19 serve as means for detachably connecting together ends 13, 13.

As can be seen from the Figures, member 12 lies generally in a single plane when inflated.

To form the pleats in the pleated wall portions 14, conventional manufacturing techniques may be employed, such as use of heat sealing, adhesives, stitching or the like. Naturally the method selected will take into consideration the need to keep the device air-tight.

Pleated wall portions 14 may be in direct open interior connection with base member 12 so that the entire body 10 may be inflated and deflated by passage of air through a single valve 11. Alternatively, pleated wall portions 14 may be inflatably interconnected with each other and physically connected to but not inflatably connected with member 12. In this case the pleated wall portions as a group and the inflatable base member as a unit are separately inflated and deflated, and of course two or more valves 11 are suitably positioned on body 10 to make this possible. Heat sealing, stitching, use of adhesives, or combinations of these or other common techniques may be used in joining and securing wall portions 14 to base member 12 during manufacture of the device. If desired, body 10 may be fabricated as a one-piece unitary structure rather than by joining the wall and base members during manufacture although as a rule the latter technique tends to be less expensive and more convenient. Irrespective of the manufacturing or fabricating techniques used, the wall portions 14 and base member 12—which itself may be made up of separately inflatable segments linked together, if desired—are air-tight so that they may be inflated during use, and are flexible and foldable so that they may be joined together at ends 13, 13 during use and deflated and folded into a compact package for transport and storage.

As best seen in FIG. 2 pleated wall portions 14 are preferably thinner in cross section when inflated than the diameter of the inflated base member 12. To insure adequate buoyancy during usage on water, base member 12 when inflated preferably has a diameter in the order of 5 to 7 inches and an over-all length (i.e., from end 13 to end 13) of at least about 10 feet and most preferably at least about 12 feet, although, of course, other suitable dimensions may be used. The height of the device when inflated may likewise be varied although in general a height of 3 to 5 feet is normally adequate.

Figure 1:
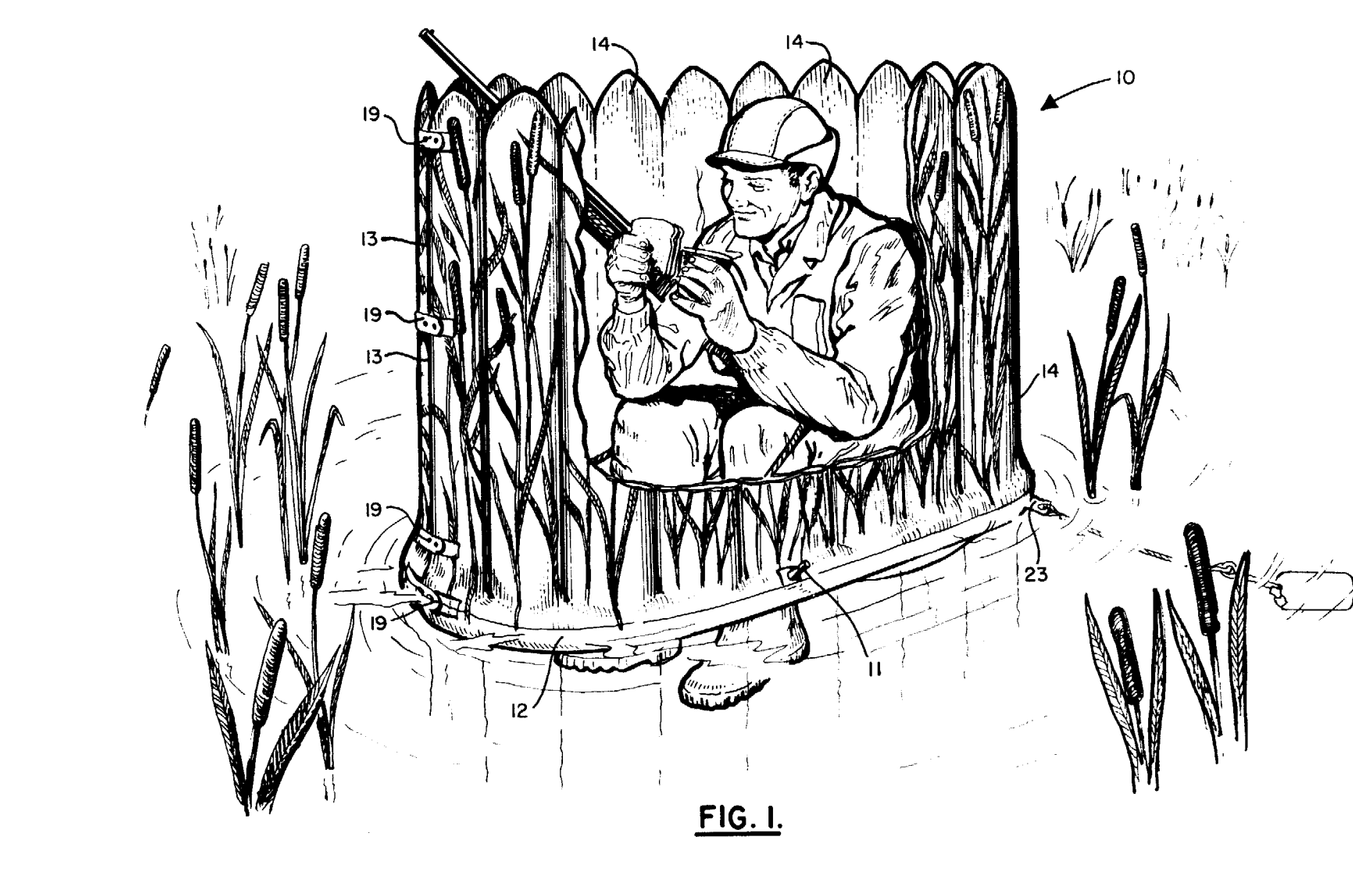
FIG. 1 is a view in perspective, with a portion of the wall cut away, of a blind of this invention depicted in use on water in inflated condition.
Figure 2:
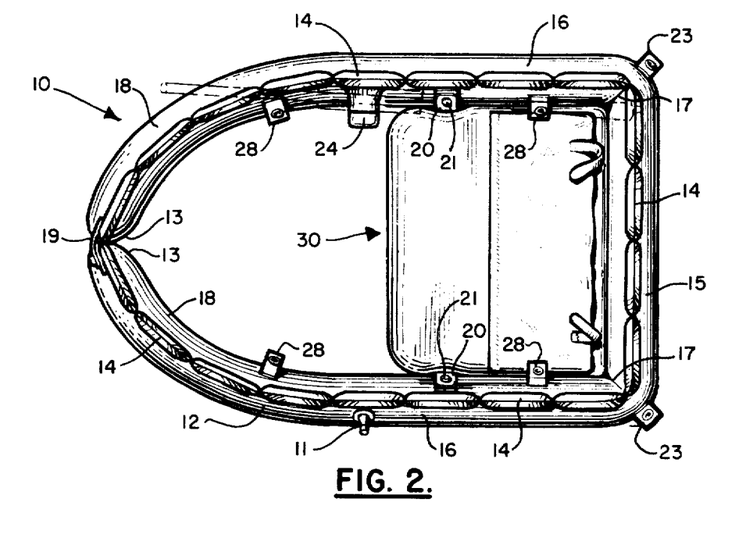
FIG. 2 is a top plan view of an inflated blind such as depicted in FIG. 1.
Figure 3:
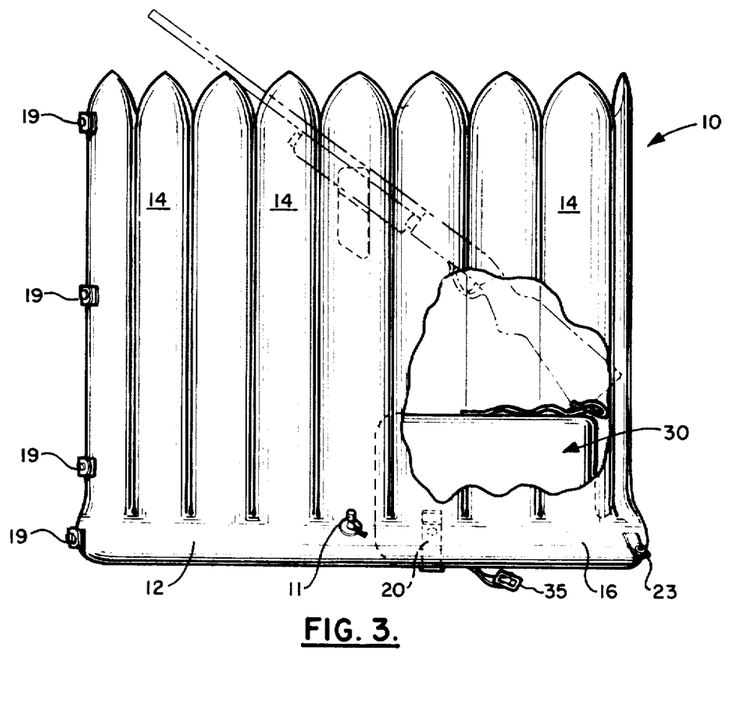
FIG. 3 is a side elevation of the inflated blind of FIG. 2 with a portion of the wall cut away.
Figure 4:
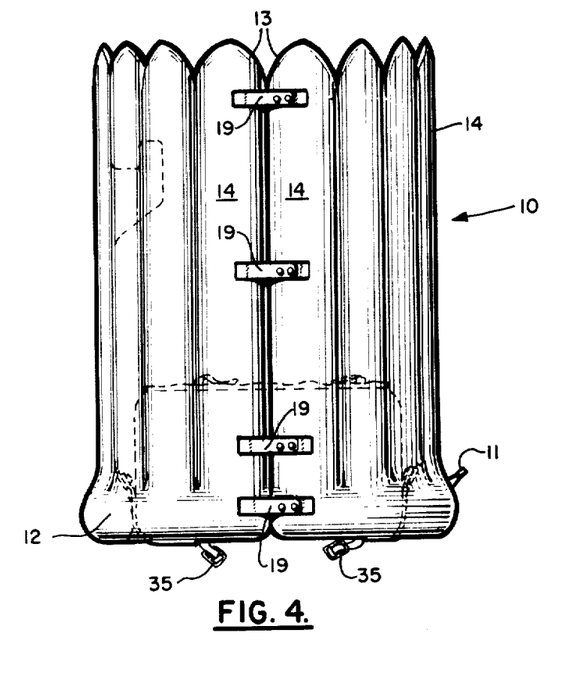
FIG. 4 is a front view of the inflated blind of FIG. 2.
Figure 5:
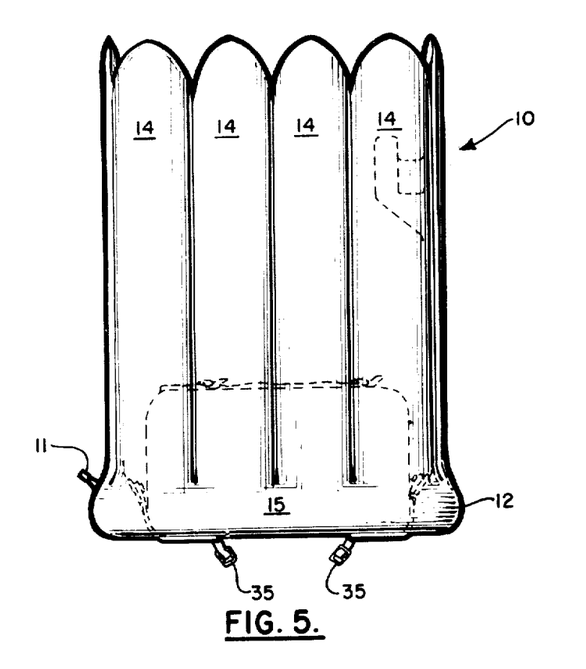
FIG. 5 is a rear view of the inflated blind of FIG. 2.

As illustrated in FIG. 1, camouflage painting or decalcomania may be affixed to the exterior of body 10. If desired, pockets or loops (not shown) may be furnished on body 10 to receive and hold pieces of underbrush, swamp grass or other plant life available at the site of usage to further assist in camouflaging the device.

Seat-forming member 30 in the form depicted is an inflatable body long enough to extend across the lower interior of body 10 and sized so that when inflated it fits within and occupies the area defined by segment 15 and the rearward portions of segments 16, 16 of the inflated base member 12. Member 30 is supported in place by means of one or more support straps 20 connected to member 30 at appropriate locations and fastened by means of snap fasteners 21 to matching snap fasteners secured to the interior of base member 12 by means of tabs 22. In addition, member 30 may be detachably connected to the lower interior of body 10 by means of additional suitably positioned snap fasteners and tabs (not shown). Anchor ties 23 attached to the exterior of base member 12 enable the blind to be tied to a tree, a post or other suitable anchoring means to prevent the blind from drifting in water.

One or more supports 24 may be furnished on the interior walls of body 10 to support equipment of the user.

Figure 6A:
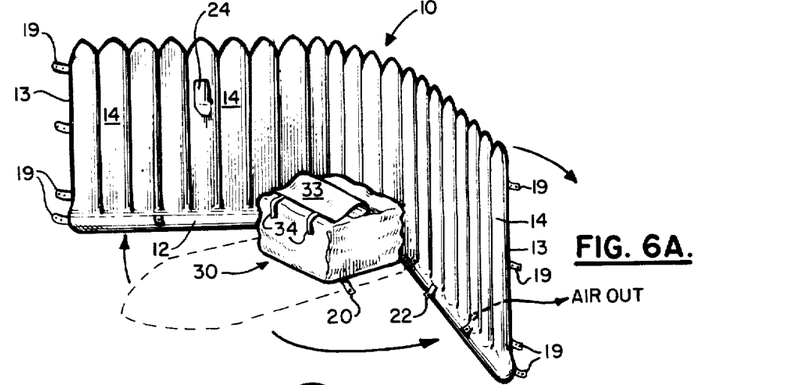
Figures 6B, 6C, 6D, 6E, 6F, 6G, 6H:
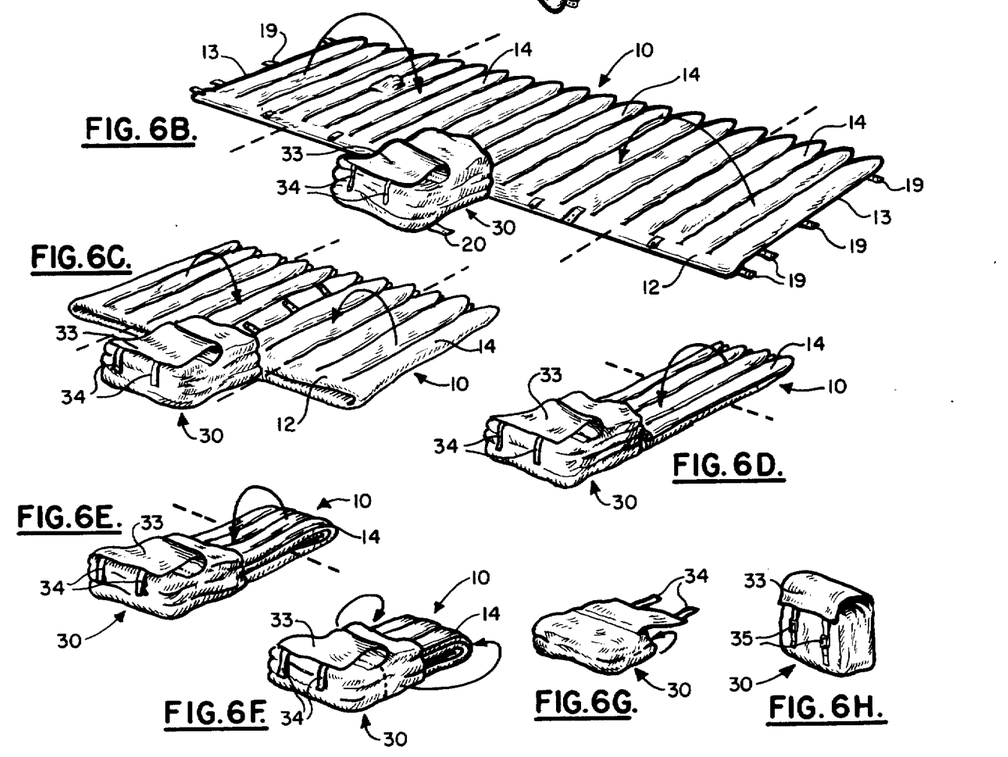
Figures 7A, 7B, 8, 9:
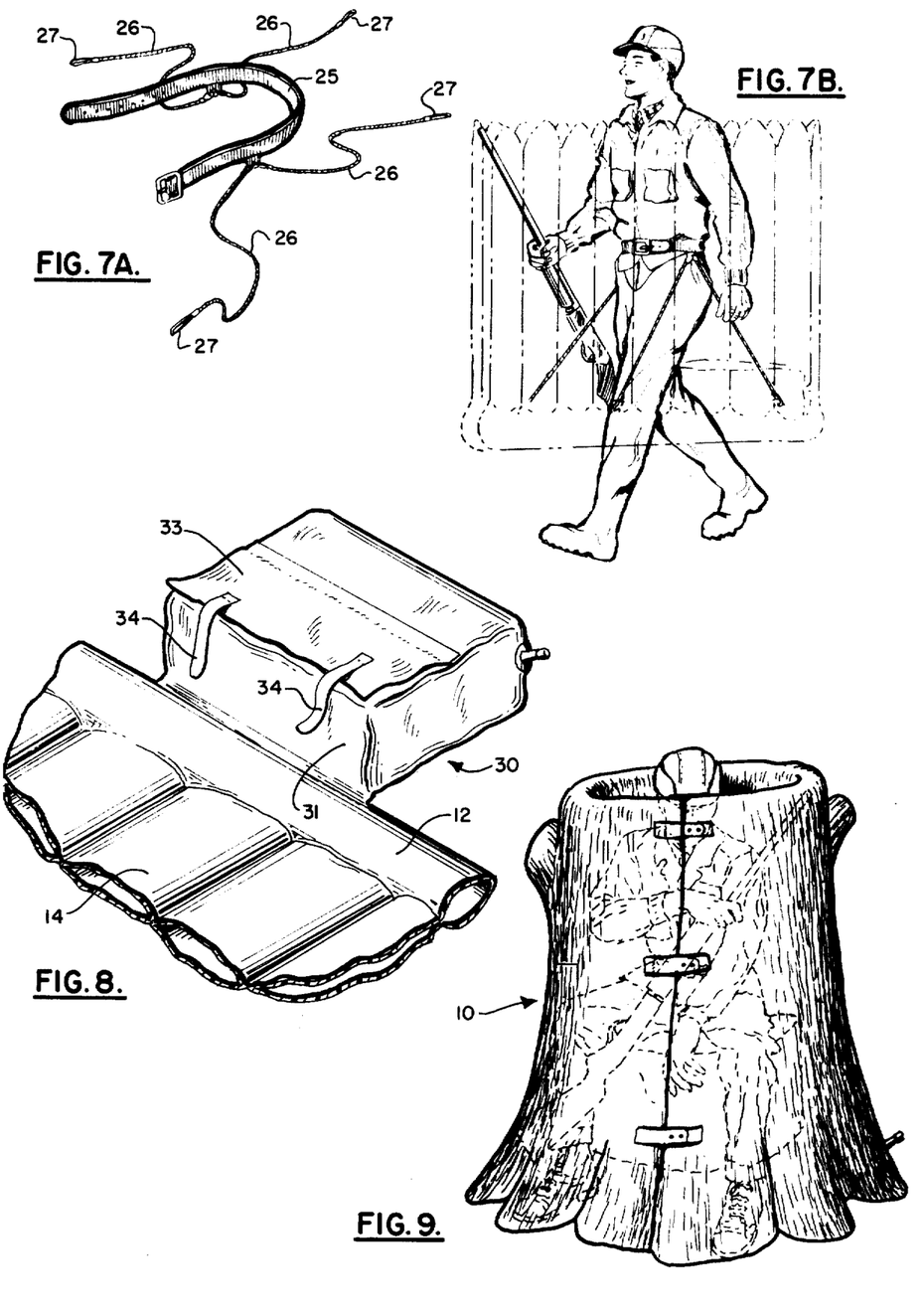

In the preferred form as depicted in FIG. 8, member 30 is composed of an inflatable rectangular cushion in which a pouch is formed when the cushion has been deflated and the blind is being packed up for storage or transportation. In this form the volume of the cushion when fully inflated is at least approximately twice the size of body 10 when body 10 has been deflated and suitably folded. Note in this connection the sequence of operations depicted in FIGS. 6A through 6H. Once deflated body 10 has been folded up into a small bundle such as shown in FIG. 6F, the bundle is pushed against backwall 31 of the cushion (note FIG. 8) whereby the walls of the back half of the cushion (i.e., the half under flap 33 in FIG. 8) are pushed into the other half of the deflated cushion so that a double walled pouch is formed which contains the bundle. Flap 33 is then secured over the opening in the pouch by means of straps 34, 34 and buckles 35, 35, which buckles do not appear in FIG. 8 as they are on the underside of member 30, but which are shown in FIG. 6H. It will of course be understood that the system in which the pouch is formed in the deflated cushion during the packing operation just described is applicable whether or not the cushion is permanently attached to the body. It will be seen that FIG. 8 depicts the particularly preferred construction wherein member 30 has a permanent connection to body 10 so that the over-all device is an essentially one-piece unitary structure. In particular, cushion 30 is connected to a segment of tubular base member 12 (preferably segment 15) along the back edge of the cushion toward which the pouch opens. As previously explained, cushion 30 is also detachably connectable to base member 12 by means of one or more support straps 20 connected to cushion 30 at suitable locations, e.g., its bottom face, straps 20 carrying snap fasteners 21 matching with snap fasteners carried on tabs 22 affixed to member 12 at appropriate locations. It will of course be understood that the matching snap fasteners are composed respectively of a male member and a female member sized to effect a tight detachable connection when snapped together, these and other suitable detachable fasteners being well-known to the art.

Instead of permanently connecting cushion 30 to body 10 as explained in the preceding paragraph, another highly preferred embodiment of this invention involves rendering these two members detachably attachable to each other such as by means of a suitable number of support straps 20 carrying snap fasteners 21 matching with snap fasteners carried on tabs 22 affixed at proper load-distributing portions of member 12 or by means of other appropriate disconnectable connection means. In this case the over-all unitary system is composed essentially of a two-piece structure, the inflatable body 10 and the seat-forming member 30 which preferably is also inflatable. In this embodiment, it is preferred that body 10 and member 30 when inflatable each be supplied with suitably placed valves so that they can be separately inflated and deflated.

In the particularly preferred embodiment wherein there is a permanent connection between member 30 and body 10, each of these connected parts may be equipped with suitably placed valves so that they can be separately inflated and deflated. Alternatively, member 30 and body 10 may be inflatably connected to each other by means of tubing or other air passageways (not shown) so that the unitary essentially one-piece system may be inflated and deflated by means of a single valve.

Instead of employing an inflatable cushion in which a pouch is formed during the folding and packing operation as previously explained in connection with FIG. 8, an inflatable cushion with a permanent pouch may be used. In this case there is provided a pouch covering essentially the entire upper or lower face of member 30, which pouch opens toward the rear of the cushion. This enables the folded bundle to be pushed into the pouch. Flap 33 is attached to the outside of member 30 and is positioned so as to cover the opening in the pouch thereof. Once again, fastening is readily effected by means of suitably positioned straps 34, 34 and buckles 35, 35. Such permanent pouches may be used with either the essentially one-piece unitary structures or the essentially two-piece unitary structures.

It will be noted that in each of the foregoing embodiments body 10 and member 30 function in concert to provide a comfortable buoyant support for the user enabling him to conceal himself from view whether on land or on water. It will also be noted that the preferred construction depicted in FIGS. 1-8 enables body 10 and member 30 to work in unison to distribute the user's weight over a large zone comprising base member 12 and cushion 30.

From FIGS. 6A through 6H it can be seen that to disassemble the device after use, joining straps 19 and support straps 20 are disconnected, the air is released from body 10 and member 30, deflated body 10 is folded several times into a compact bundle which is inserted into the pouch of member 30 and flap 33 is detachably secured in place by means of straps 34 and buckles 35. It will of course be self-evident that to assemble the device for use, the procedure just described is reversed by proceeding through the sequence of FIG. 6H through 6A, unfolding the body instead of folding it, inflating it instead of deflating it, and connecting the straps 19, 20 instead of disconnecting them.

FIG. 9 illustrates the fact that the blinds of this invention can be furnished in a variety of configurations. In FIG. 9 the inflatable body providing the concealment enclosure is shaped to resemble a tree stump. As in the case of the embodiments previously described the seat member having the pouch therein is positioned within the interior of the inflated blind for use by the occupant. It will be appreciated that the embodiment of FIG. 9 is designed primarily for use on land. Accordingly, there is no need in this embodiment to furnish connections between the inflatable cushion—these two members are preferably furnished as separate, independently inflatable parts, the pouch in the cushion of course being large enough to accommodate the folded, deflated body.

Referring now primarily to FIGS. 7A and 7B another preferred embodiment of this invention involves providing belt 25 which is secured around the user's waist. Lines 26 which are carried on belt 25 have spring clips 27 or other suitable attaching means which can be fastened to tabs 28 suitably positioned on the interior of body 10 (note FIG. 2). This enables the user to stand erect and walk about on land or in shallow water with unobstructed view while carrying the inflated blind with him (note FIG. 7B).

It will thus be readily apparent that the preferred device of this invention is entirely self-contained, i.e., there are no unnecessary extra parts used for storing or carrying the blind. That is to say, the seat-forming member also serves as a means for packaging and carrying the inflatable body as well as the optional belt and carrying means depicted in FIGS. 7A and 7B. This feature reduces the likelihood of components being mislaid or lost during storage or use. In fact, the most preferred blinds of this invention involve one- or two-piece unitary structures. And, in addition the inflatable body and the inflatable seat-forming means work together during use to enhance the buoyancy of the overall system on water when supporting the weight of the user and his equipment.

It will now be obvious to one skilled in the art that various changes may be made in the invention without departing from its true spirit and scope. Accordingly, this invention is not intended to be unduly limited by that which is illustrated in the Drawings and described in the specification.

I claim:

1. An inflatable blind comprising
   1. an inflatable seat-forming member of sufficient flexibility such that when in deflated condition it can be manually depressed into itself to thereby form a double-walled pouch,
   2. a flexible inflatable body for use with said seat-forming member and adapted when deflated and folded to fit within said pouch and when inflated to furnish around said member an upstanding wall affording concealment for the user, and
   3. means connecting and supporting said member across the lower interior of the inflated body.

2. The device of claim 1 wherein said body includes an elongate inflatable tubular base member from which the inflatable wall extends.

3. The device of claim 1 wherein said seat-forming member has a permanent connection to said body so that the device is an essentially one-piece unitary structure.

4. The device of claim 1 wherein said seat-forming member is detachably connected to said body so that the device is an essentially two-piece structure.

5. The device of claim 1 wherein said seat-forming member has a permanent connection to said body along the back edge of said member toward which the pouch when formed opens, and wherein said member is detachably connectable to said body in the vicinity of the sides of the member.

6. The device of claim 1 wherein said body includes an inflatable tubular base member and a plurality of inflatable pleated wall portions extending from one side and being disposed along substantially the entire length of said base member, said body when inflated being bendable so that its two ends can be brought together to circumscribe a zone of concealment, and wherein said device includes means for detachably connecting together said two ends of said body to maintain said zone of concealment.

7. The device of claim 1 further including means adapted to be secured on the torso of the user for supporting the device when inflated above ground level and below eye level of the user.

8. A unitary inflatable blind adapted for use on land and on water which comprises
   1. an inflatable seat-forming cushion having a pouch aligned on one face thereof;

2. a flexible inflatable body comprising an elongate inflatable tubular base member and a plurality of inflatable pleated wall portions extending from one side of said base member and being disposed along substantially the entire length of said base member, said body being adapted:
   a. when deflated to be foldable upon itself into compact form to fit within said pouch, and
   b. when inflated to be bendable so that its two ends can be brought together with the wall portions extending upwardly from said base member to circumscribe a zone of concealment;
3. means connecting and supporting said cushion across the lower interior of the inflated body; and
4. means detachably connecting together said two ends of said body to maintain said zone of concealment;

said cushion having a permanent connection to said body so that the device is an essentially one-piece structure.

9. The device of claim 8 wherein said cushion is detachably connectable to said body in the vicinity of the sides of the cushion.

10. The device of claim 8 wherein said cushion has a permanent connection to said tubular base member along the back edge of said cushion toward which the pouch opens, said connection involving a segment of said base member intermediate the ends thereof, and wherein said cushion is detachably connectable to said base member in the vicinity of the sides of the cushion, said detachable connections involving portions of said base member closer to the ends thereof than said segment.

11. The device of claim 8 wherein said cushion and said body are separately inflatable and deflatable.

12. The device of claim 8 wherein said cushion and said body are inflatably interconnected so that they are inflatable and deflatable in unison.

13. The device of claim 8 further including means adapted to be secured on the torso of the user for supporting the device when inflated above ground level and below eye level of the user.

14. The device of claim 8 wherein said seat-forming cushion further includes a flap adapted to be detachably secured over the opening in said pouch when said body folded into compact form is contained within said pouch.

15. A unitary inflatable blind adapted for use on land and on water which comprises
   1. an inflatable seat-forming cushion having a flap aligned on one face thereof, the cushion when deflated being sufficiently flexible so that essentially one-half of the cushion can be manually depressed into the other half thereof to thereby form a double-walled pouch, the opening in the pouch so-formed being coverable by said flap;
   2. a flexible inflatable body comprising an elongate inflatable tubular base member and a plurality of inflatable pleated wall portions extending from one side of said base member and being disposed along substantially the entire length of said base member, said body being adapted:
      a. when deflated to be foldable upon itself into compact form to fit within said pouch, and
      b. when inflated to be bendable so that its two ends can be brought together with the wall portions extending upwardly from said base member to circumscribe a zone of concealment;
   3. means connecting and supporting said cushion across the lower interior of the inflated body; and
   4. means detachably connecting together said two ends of said body to maintain said zone of concealment.

16. The device of claim 15 wherein said cushion has a permanent connection to said body so that the device is an essentially one-piece structure.

17. The device of claim 15 wherein said cushion is detachably connectable to said body so that the device is an essentially two-piece structure.

* * * * *